F. E. FELTS.
ELEVATED SUSPENDED TRACK AUTOMOTOR RAILWAY.
APPLICATION FILED AUG. 21, 1907.
928,435.
Patented July 20, 1909.
12 SHEETS—SHEET 2.
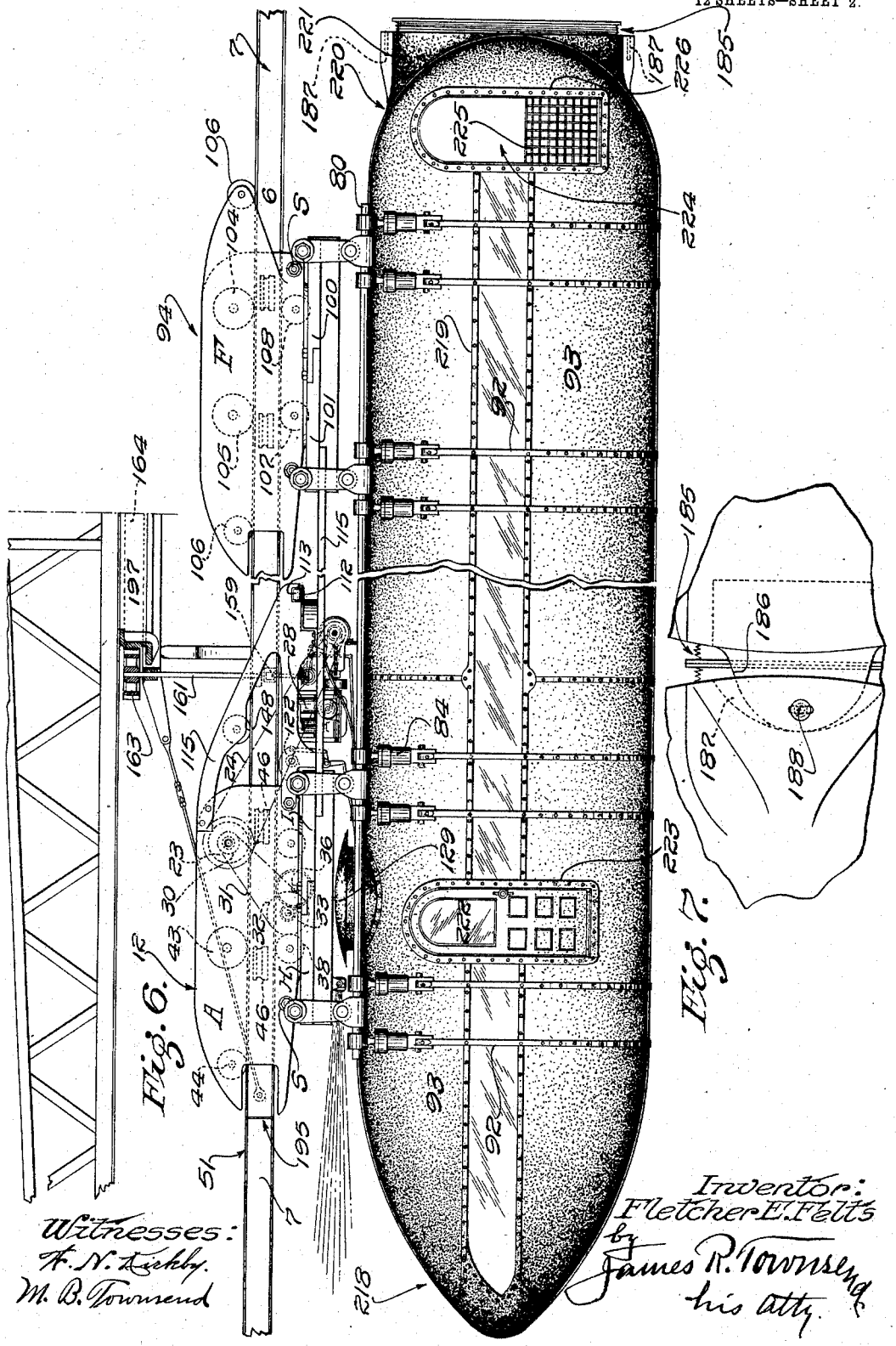
Witnesses:
H. N. Kirkby.
M. B. Townsend
Inventor:
Fletcher E. Felts
by James R. Townsend
his atty.

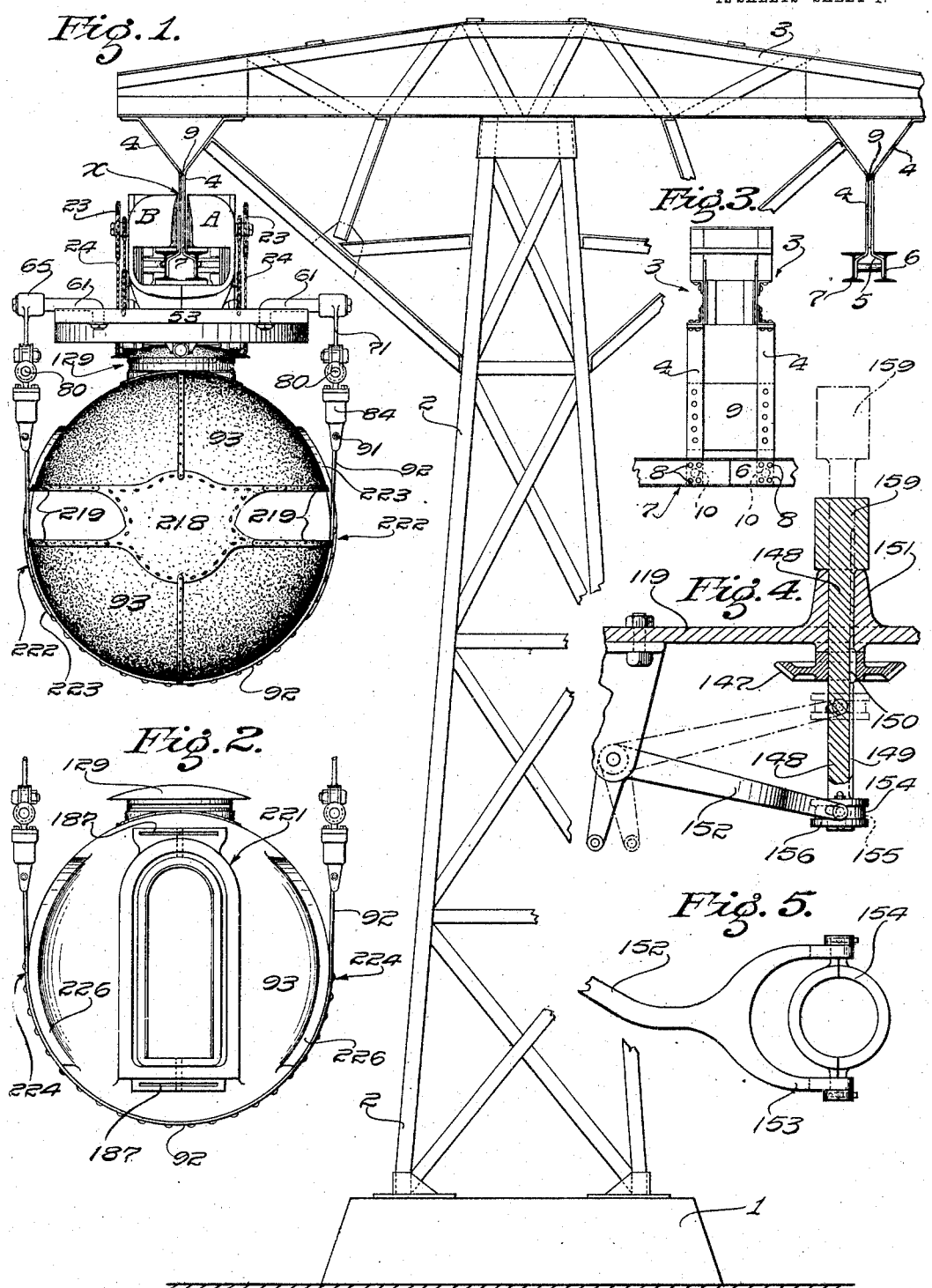

F. E. FELTS.
ELEVATED SUSPENDED TRACK AUTOMOTOR RAILWAY.
APPLICATION FILED AUG. 21, 1907.
928,435.
Patented July 20, 1909.
12 SHEETS—SHEET 3.
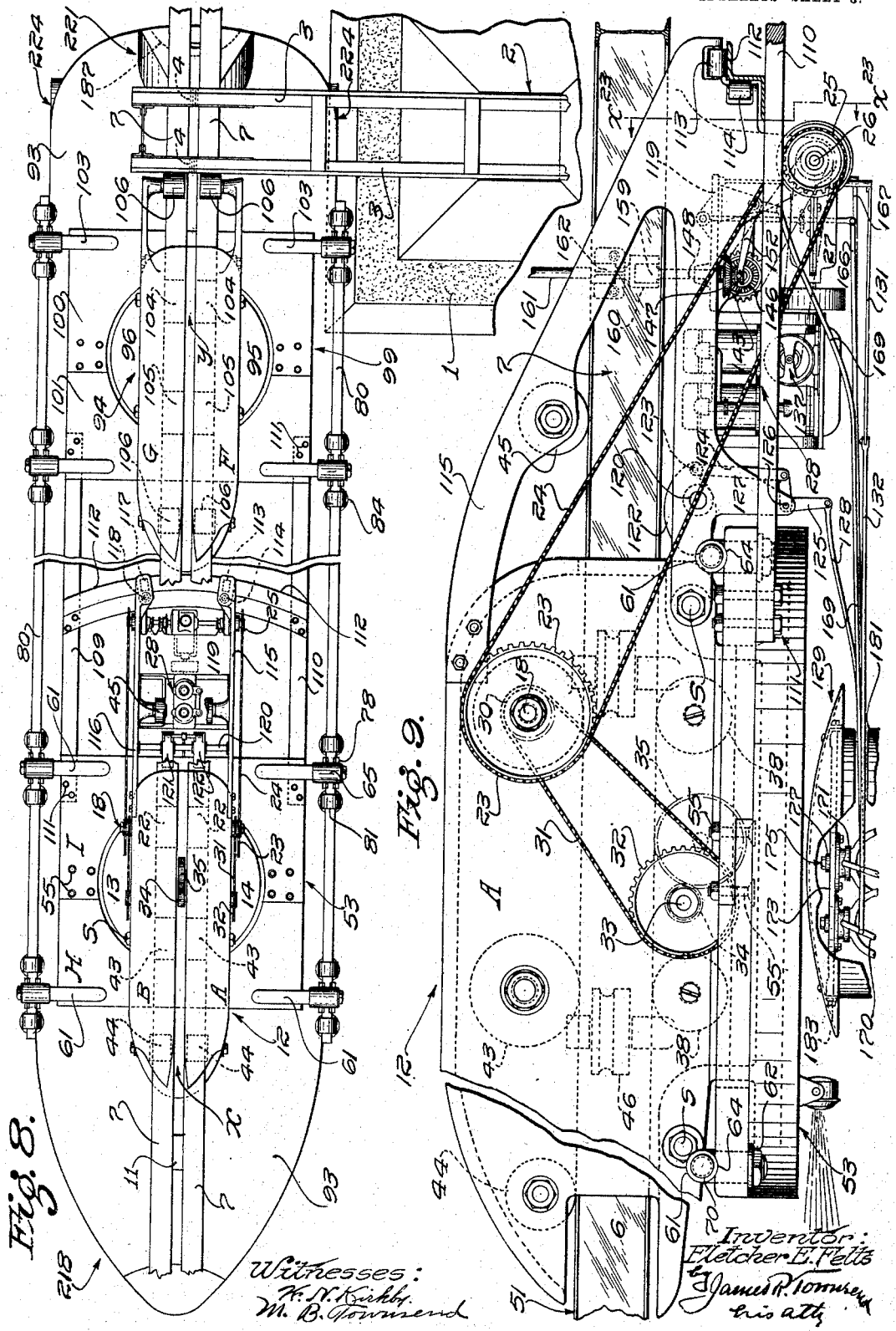

F. E. FELTS.
ELEVATED SUSPENDED TRACK AUTOMOTOR RAILWAY.
APPLICATION FILED AUG. 21, 1907.
928,435.
Patented July 20, 1909.
12 SHEETS—SHEET 4.
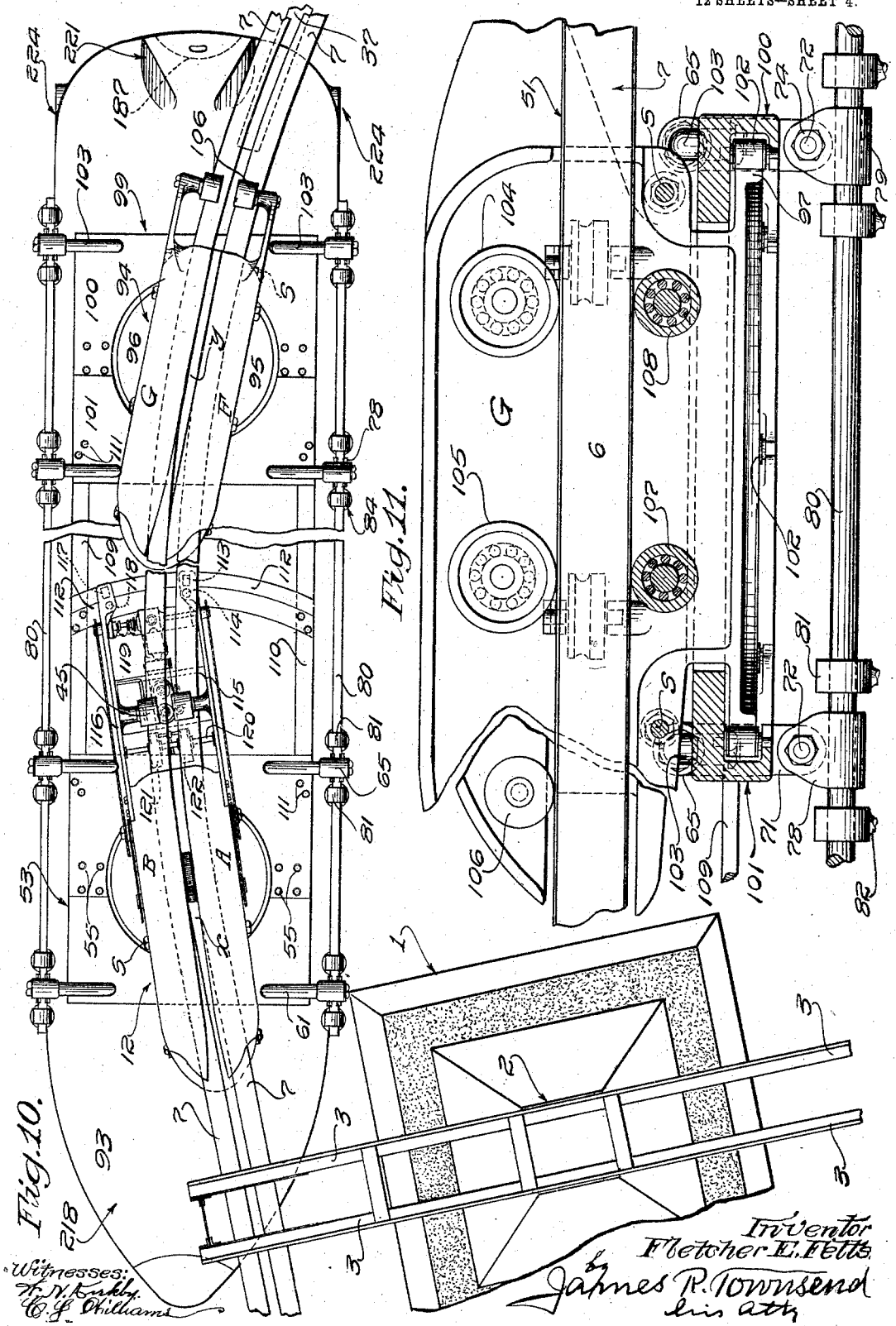

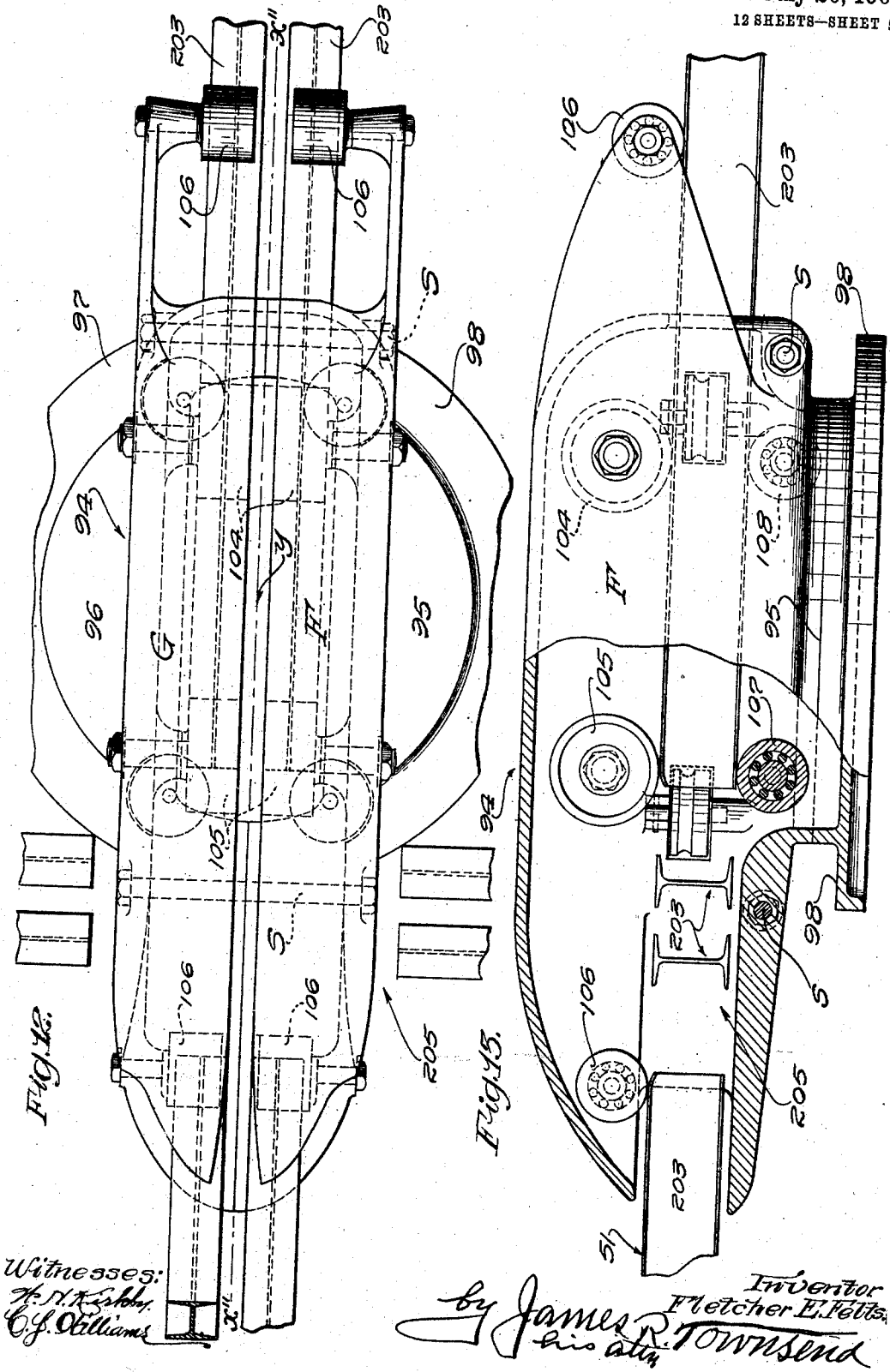

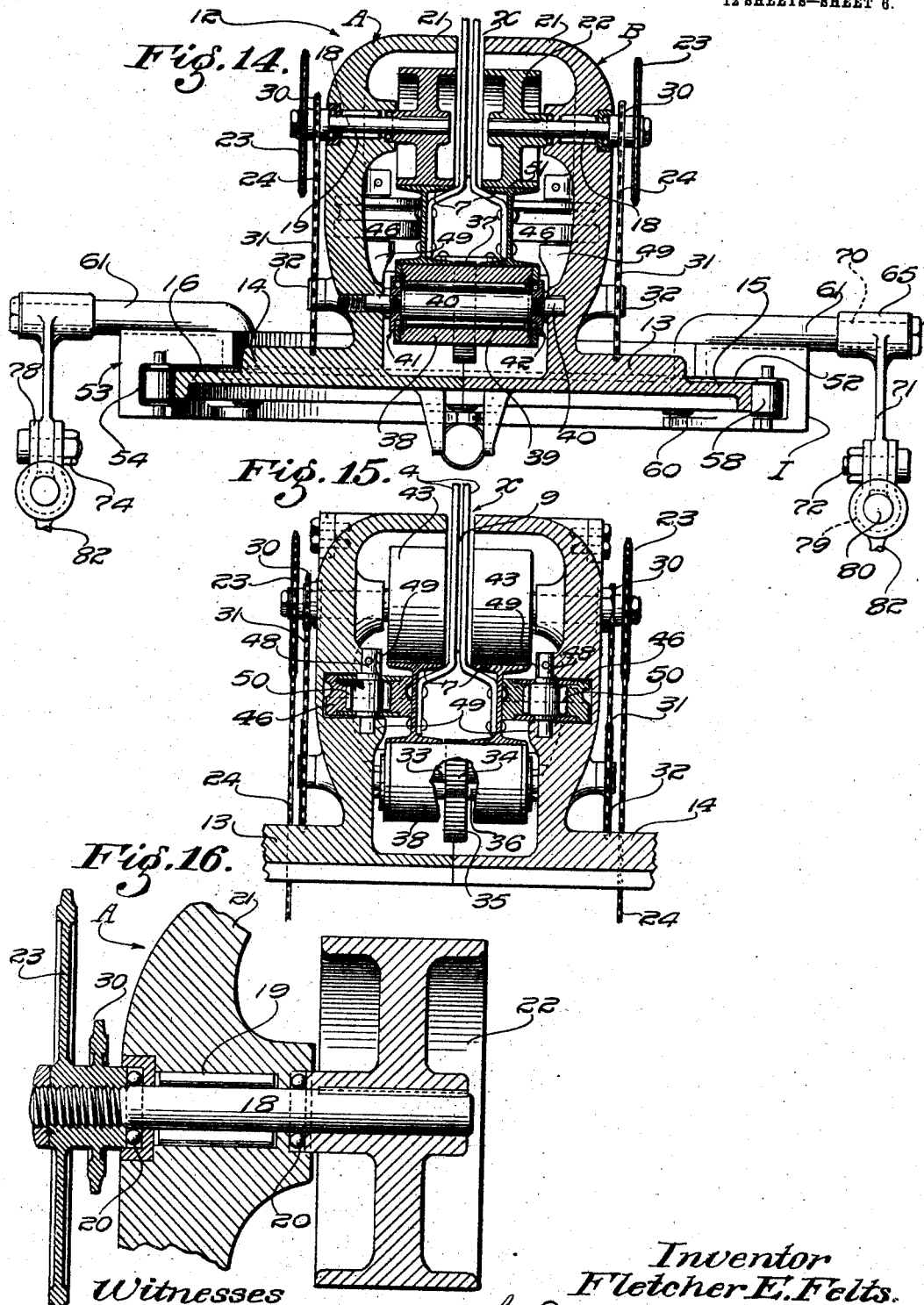

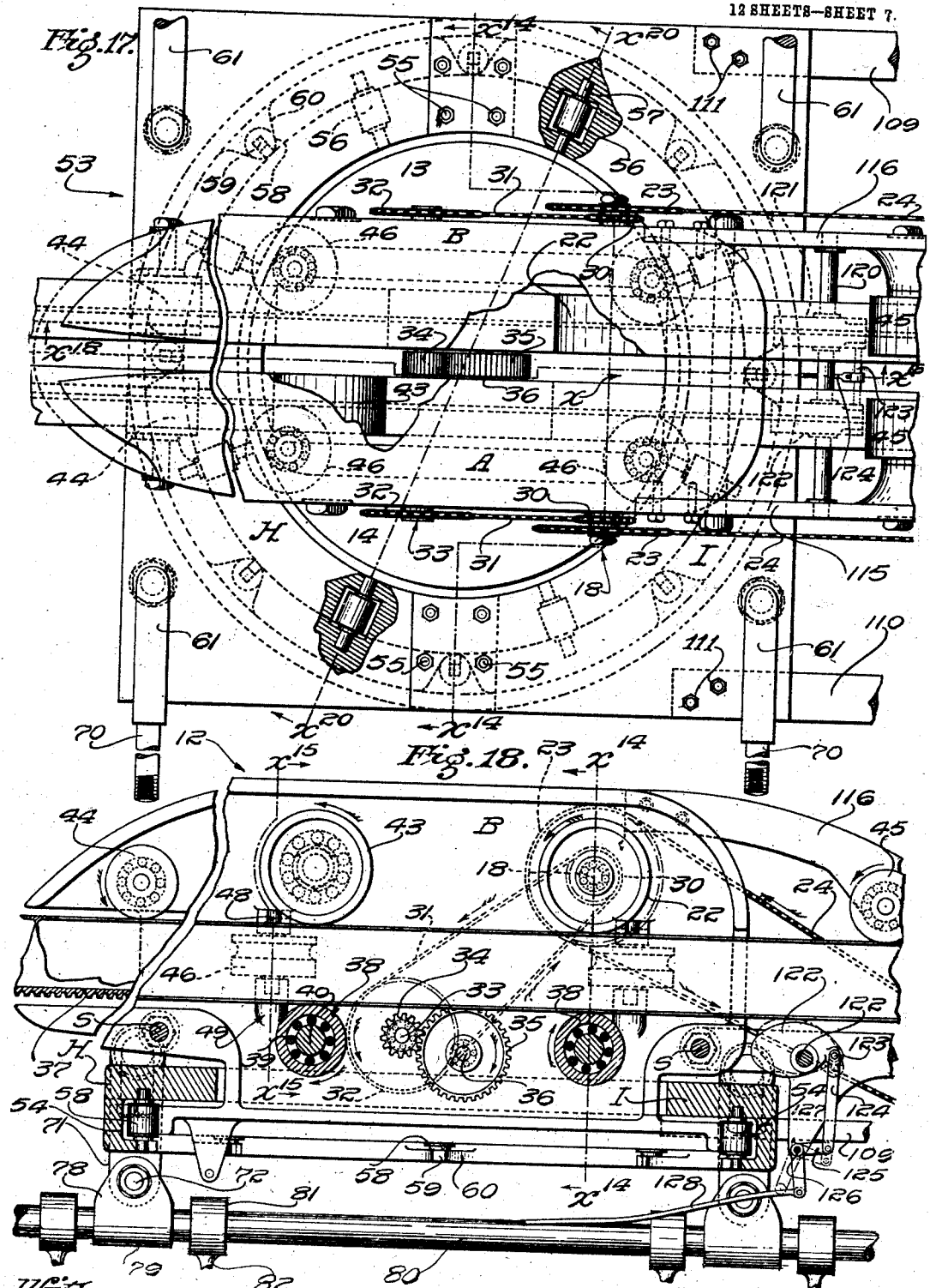

F. E. FELTS.
ELEVATED SUSPENDED TRACK AUTOMOTOR RAILWAY.
APPLICATION FILED AUG. 21, 1907.
928,435.
Patented July 20, 1909.
12 SHEETS—SHEET 8.
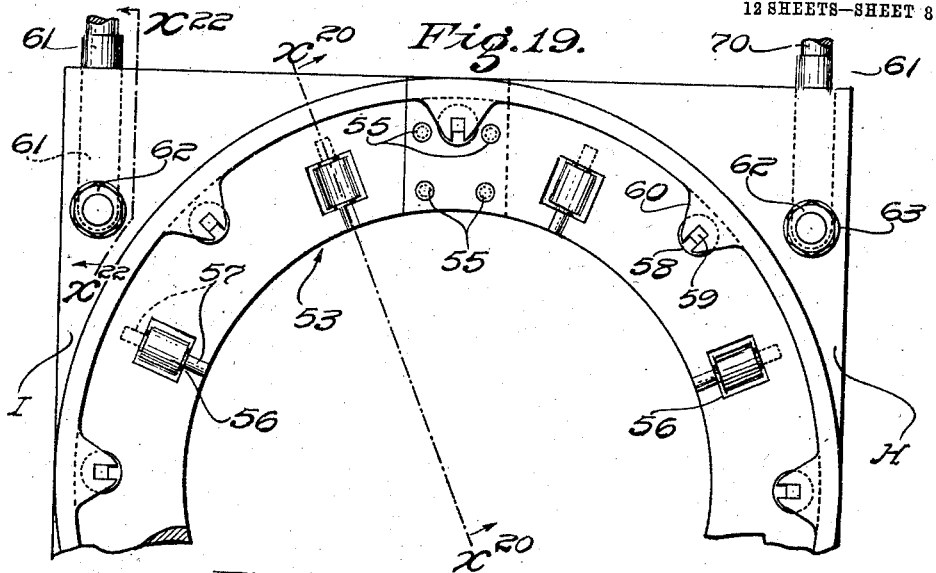
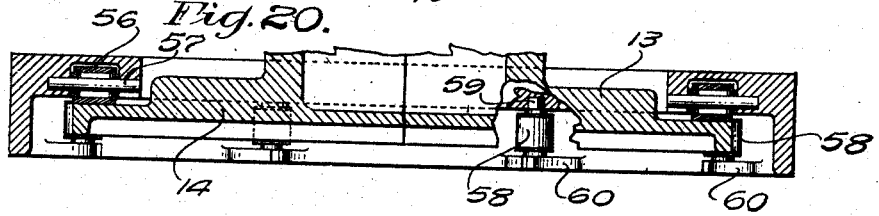
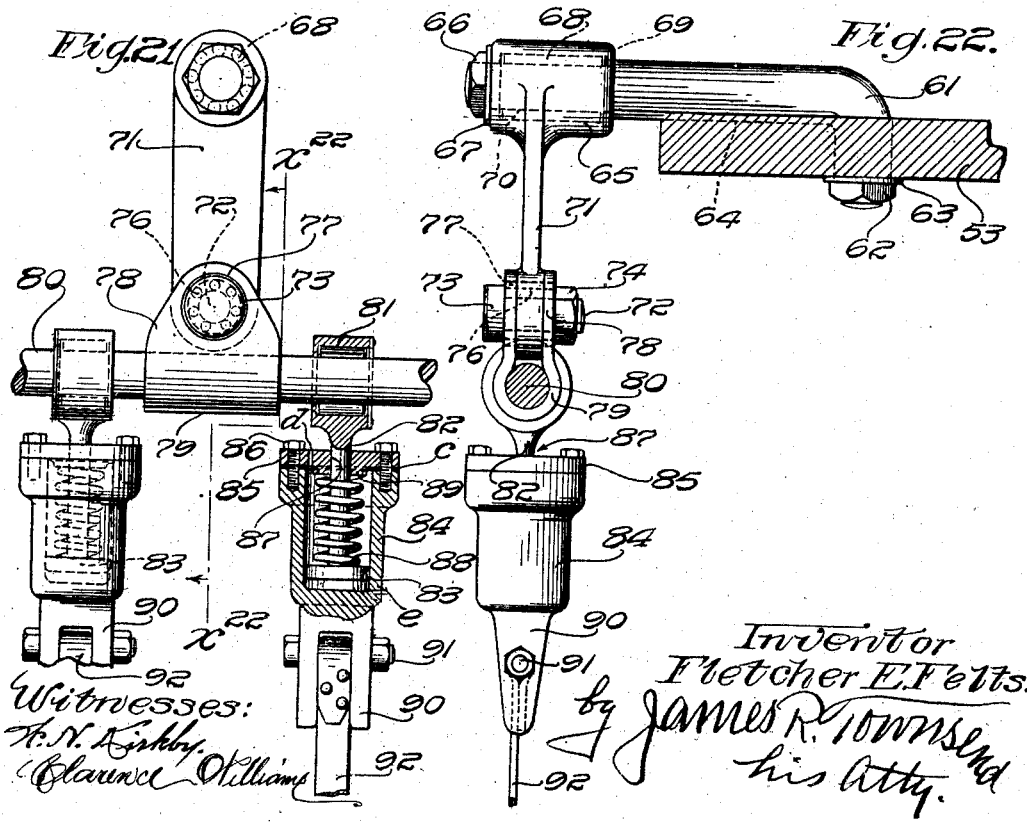
Inventor
Fletcher E. Felts.
by James R. Townsend
his Atty.
Witnesses:

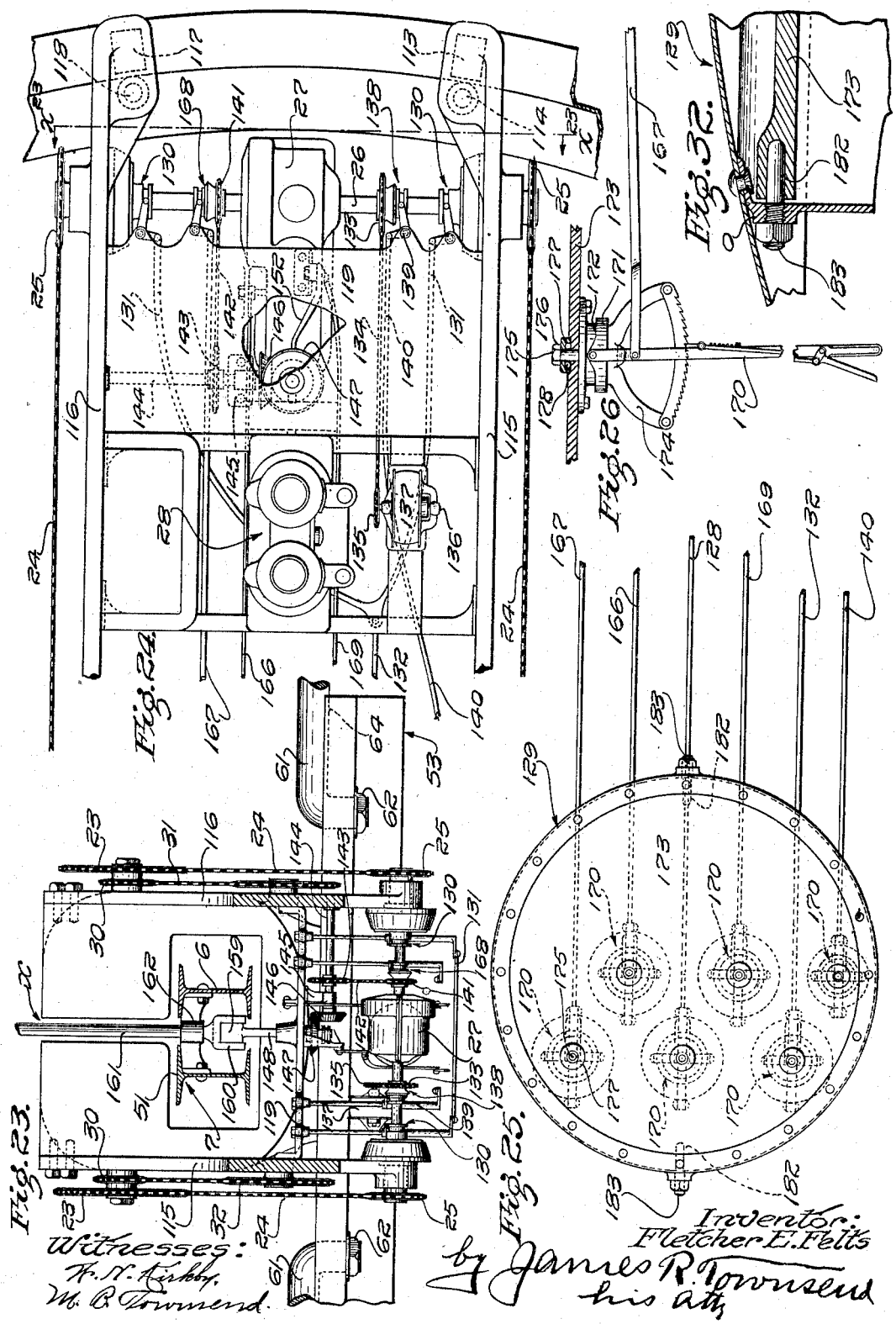

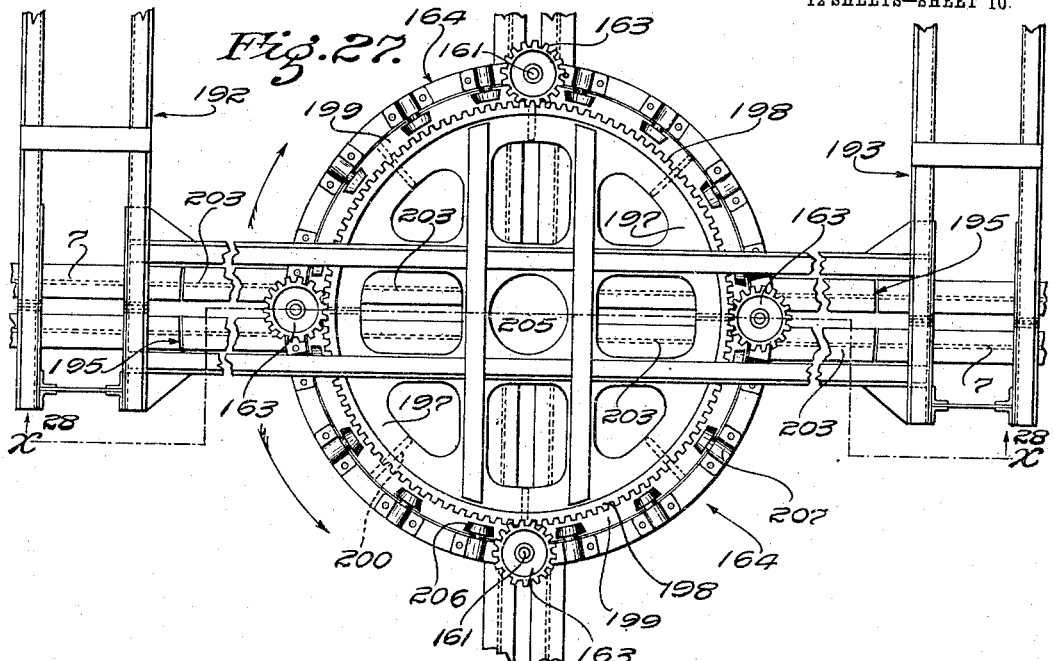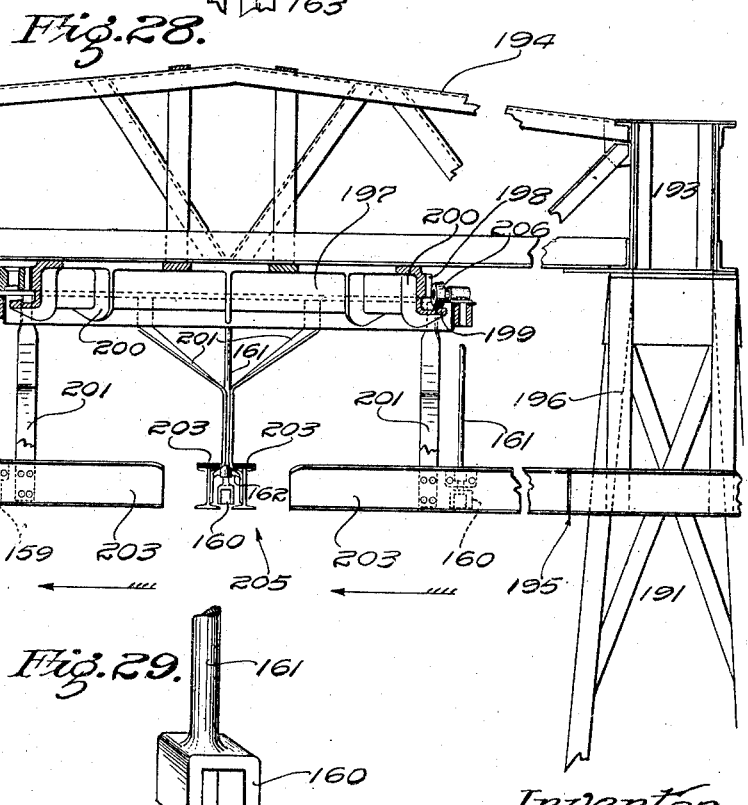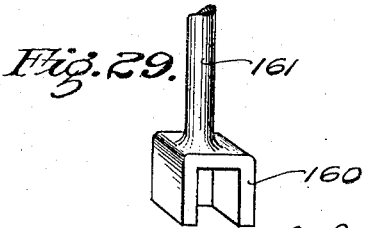

F. E. FELTS.
ELEVATED SUSPENDED TRACK AUTOMOTOR RAILWAY
APPLICATION FILED AUG. 21, 1907.
928,435.
Patented July 20, 1909.
12 SHEETS—SHEET 11.
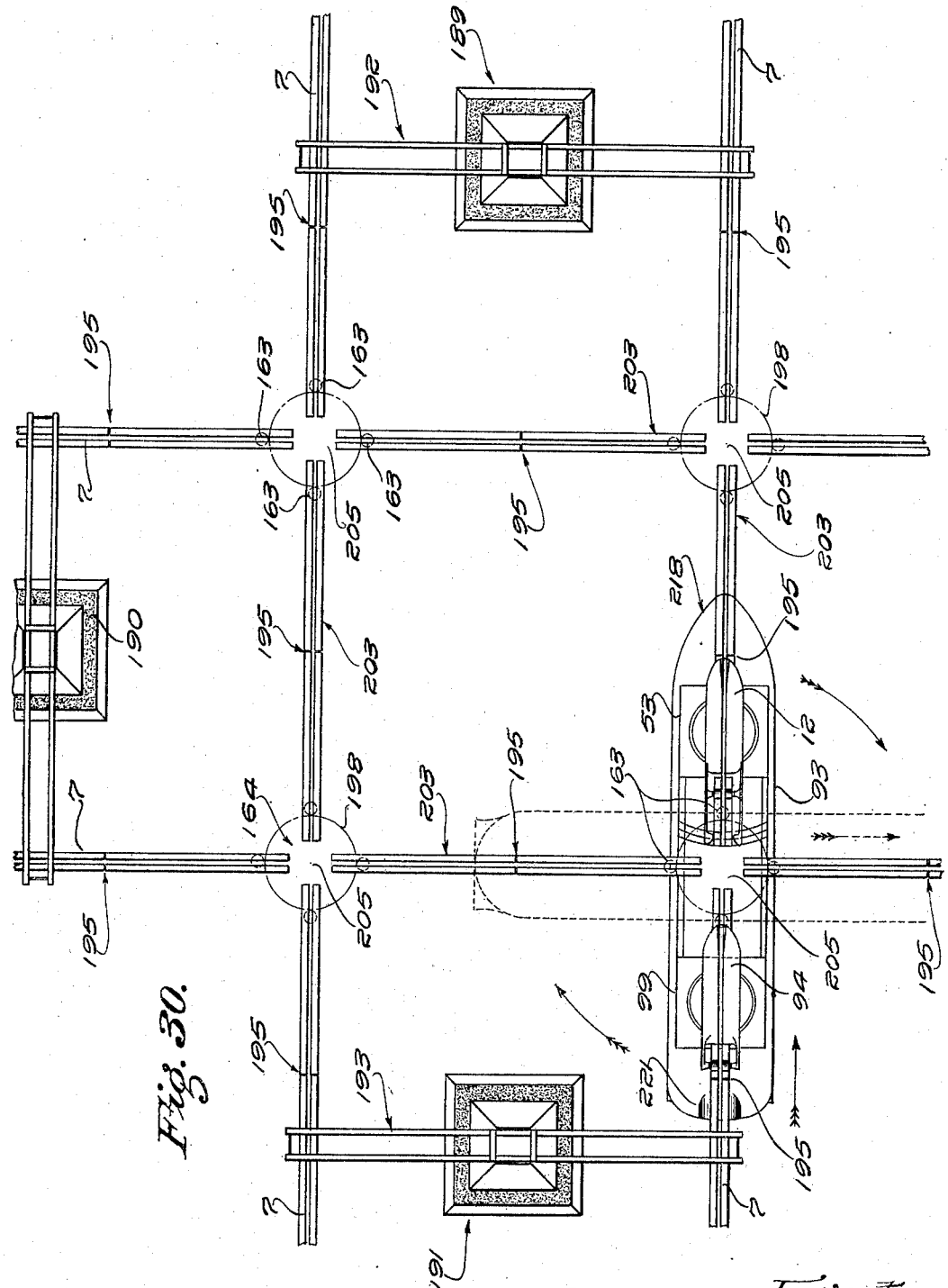

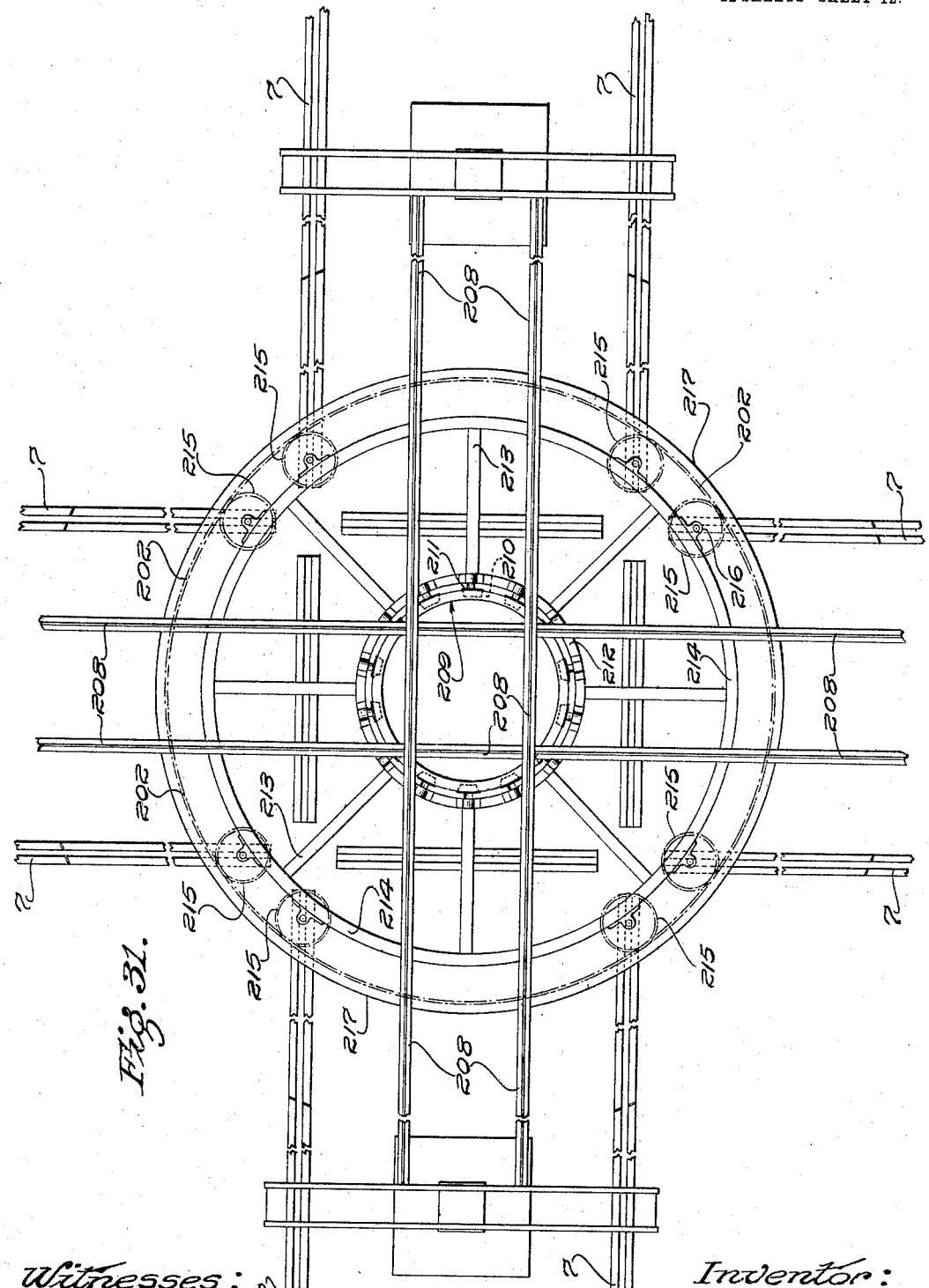

UNITED STATES PATENT OFFICE.

FLETCHER E. FELTS, OF LOS ANGELES, CALIFORNIA.

ELEVATED SUSPENDED-TRACK AUTOMOTOR-RAILWAY.

No. 928,435.     Specification of Letters Patent.     Patented July 20, 1909.

Application filed August 21, 1907. Serial No. 389,584.

*To all whom it may concern:*

Be it known that I, FLETCHER E. FELTS, a citizen of the United States, residing at Los Angeles, in the county of Los Angeles and State of California, have invented a new and useful Elevated Suspended-Track Automotor-Railway, of which the following is a specification.

This invention relates to railway systems in which self-propelling cars are used on an elevated and suspended single track; one of the objects of the invention being to provide a simplified and economical railway system for all purposes of passenger and freight traffic.

Other objects may appear from the following description.

The accompanying drawings illustrate the invention.

Figure 1 is a fragmentary end elevation of one of the towers and gallows, showing in section the track and a car resting on and carried by said track. Fig. 2 is a rear view of the car-body proper. Fig. 3 is an elevation of one of the gallows, showing anchors or drop-arms for suspending the I-beams or track. Fig. 4 is a fragmental section of the mechanism used for raising the turntable-driver to connect with the turntable pinion. The dotted lines show operative position for turntable. Fig. 5 is a fragmental plan of lever and collar used for lifting turntable-driver to pinion-shaft. Fig. 6 is a side elevation of a car, together with its appurtenant parts, resting on the severed portions of the track which are supported by the turntable, and the turntable-driver shown in engagement with the pinion-shaft preparatory to switching the car to another track. Fig. 7 is a fragmental plan of coupling between cars. Fig. 8 is a fragmental plan of a car on a straight track, and also of the base and one of the supporting gallows of the tower. Fig. 9 is a fragmental side elevation of the front carriage on turntable track, showing in dotted lines turntable-driver in engagement with the pinion-shaft. Fig. 10 is a fragmental plan of a car on a curve, and also of one of the supporting gallows of the tower and base. Fig. 11 is a fragmental, sectional elevation of rear carriage on lines $x^{11}$—$x^{11}$, Fig. 12, showing section of turntable mounted thereon, and car-supporting hangers. Fig. 12 is a plan of rear carriage crossing a gap of track in turntable. Fig. 13 is a broken view of section F, showing in section a portion of the shell of section G, as well as the traction wheels and end roller. Fig. 14 is a section through front carriage on lines $x^{14}$—$x^{14}$, Figs. 17 and 18, looking in direction of arrows, and showing track, upper, lower and side roller-bearing-rollers; also carriage turntable with hangers for suspending car-body supporting-rods. Rack is shown in mesh with gear which is used when inclines are encountered. Fig. 15 is a vertical section of the same, on line $x^{15}$—$x^{15}$, Fig. 18. Fig. 16 is an enlarged vertical section showing traction wheel with its arbor revolving on roller bearings mounted in fragment of shell; also end thrust ball-bearings; also mode of fastening sprockets to arbor. Fig. 17 is a fragmental general plan of forward carriage with its turntable. Fig. 18 is a fragmental, sectional elevation of front carriage on lines $x^{18}$—$x^{18}$, Fig. 17, looking in direction of arrows. Brake mechanism for the car is shown in this view. Fig. 19 is a partial bottom view of the turntable. Fig. 20 is a section on line indicated by $x^{20}$—$x^{20}$, Figs. 17 and 19. Fig. 21 is a side elevation of the hanger for car-body-supporting rod, and a fragmental elevation and section of hangers for car-body proper. Fig. 22 is an end elevation of same showing fragment of turntable. Fig. 23 is a sectional end elevation of front carriage on lines $x^{23}$—$x^{23}$, Figs. 9 and 24, looking in direction of arrows, showing general arrangement of driving mechanism. Fig. 24 is a fragmental plan showing the arrangement of the driving mechanism mounted in the tenders of front carriage shown in Fig. 9. Fig. 25 is a plan showing arrangement of revolving operating levers in conning tower, the top being omitted. Fig. 26 is an elevation of one of the quadrants and revolving operating levers in conning tower. Fig. 27 is a plan of single track narrow gage turntable, showing a fragment of the gallows and connecting truss; the other turntable in this view being omitted. Fig. 28 is a sectional elevation on lines $x^{28}$—$x^{28}$, Fig. 27, looking in the direction of arrows. Fig. 29 is a perspective view of boxing or cuff used in revolving turntable. Fig. 30 is a diagrammatic plan showing mode of transferring cars in narrow-gage system, a car being shown in position to be switched to another track. The switched car is shown in dotted lines. Fig. 31 is a plan showing general arrangement of standard turntable for broad-gage track system. Fig. 32 is a fragmentary sectional view showing top of conning tower and pivotal lever support.

1 is a concrete foundation or base. 2 is a steel tower erected thereon, and provided with steel-trussed gallow-frames 3.

4 designates anchors or drop-arms riveted to bottom chords of the gallows and at each end of the same. The ends of the hangers are bent as seen at 5, and fashioned to fit the shape of I-beams 7, to the webs 6 of which they are securely fastened by rivets 8.

9 is a stiffening plate riveted to the hangers or drop-arms 4 to insure against buckling resulting from vibration or sudden shocks.

10 designates distance pieces for the hangers or drop-arms 4, the same being made of sections of gas pipe secured by bolts which extend through the bore of the pipe.

11 designates filler blocks made of cast iron, located between the flanges and webs 6 of the I-beams 7, as seen in Fig. 8, to keep the same uniformly equidistant. The I-beams 7 which are riveted to the drop-arms or hangers 4, form a track for the carriage of the car body to be hereinafter described.

12 is a carriage composed of two sections, A and B, and provided on the bottom with semicircular platforms 13 and 14 which abut against each other beneath the track or I-beams 7, and which are provided with semicircular flanges 15 and 16.

18 designates arbors or shafts revolving on roller bearings 19 and ball-bearings 20, and extending through the walls 21 of the sections A and B of the carriage.

22 designates traction wheels keyed on the arbors or shafts 18, the said wheels being located within the sections A and B, which form housing for the same. These wheels are arranged to run on the flange of the I-beams 7 for propelling the carriage.

In Fig. 14, x designates a slot provided to allow free run of the carriage on each side of drop-arms or hangers 4 at each pier and gallows-frame, each traction-wheel working on its own arbor or shaft.

23 designates sprockets which are fastened on the ends of the shafts 18 and which are connected by chains 24 with the sprockets 25 keyed on the driven shaft 26 which receives its motion from a prime-mover housed in a casing 27, and which in the present instance is a gas engine shown at 28 in Fig. 9. 30 designates sprockets also mounted on shafts 18, said sprockets being connected by chains 31 with the sprockets 32 keyed onto shaft 33 which extends through both sections of shell A and B, and forms a tie which will hold said sections rigidly together.

34 is a pinion fastened to the center of shaft 33 which is arranged to mesh with a larger gear 35 keyed on the shaft or arbor 36 and having bearings in the walls of the shells. This gear is so arranged that it is always parallel to and equidistant from the inside edges of bottom flanges of double I-beam-track 7. The space between the two inner edges of the I-beam is occupied by a rack 37 shown in Fig. 18. The gear 35, engaging the said rack 37, coöperates with the prime-mover in overcoming grades. This gear 35 steadily revolves with the prime-mover and engages at the time that the horizontal line of travel is altered and changed into a grade, the rack 37 thus assisting the prime-mover in ascending grades, the power from the engine being transmitted not only to the wheels 22 but also to the gear 35; in this manner avoiding slipping of rollers and therefore keeping their tractive power normal. This rack 37 is fixed to the flanges of the I-beams 7 wherever inclines exist.

38 designates rollers mounted on roller bearings 39 and also on shaft 40 which has its bearing in shell of carriage. These rollers are constantly in contact with the full surface of bottom flanges of the I-beams, as seen from Fig. 18, and serve to prevent the swaying, swerving, or rocking of the carriage during high speed or at curves.

41 designates ball-caps which are fastened to the shaft 40, and 42 designates balls in the caps provided for the purpose of offsetting the end thrust of said rollers 38.

43 designates roller-bearing-wheels mounted in the shells A and B of the carriage and provided to ride upon the top flanges of the I-beams or tracks. These rollers are sufficiently distanced to permit of the free travel of the drop-arms or hangers through the slot x in the carriage.

44 designates roller-bearing-wheels set in the forward part of the carriage for the purpose of allowing the carriage to pass through gap of tracks in the turntable, said rollers forming a firm and positive rest for the load on the main track. Other roller-bearing-wheels 45 of the same type are located at the rear end of the carriage and designed to exercise the same function as the aforesaid rollers 44.

To insure constant contact of the traction wheels on the upper flanges of the I-beams, I provide side rollers 46 fastened to shafts 48 which are seated and rigidly secured in lugs 49 cast solid in the walls of the shells of the carriages.

50 designates roller-bearings on which the rollers 46 operate. These side rollers engaging the web of the I-beams are designed to insure steadiness and rigidity to the carriages and to keep the traction wheels continually tangential to full surface 51 of upper flanges of track.

The circular flange or offset 52 formed by the semicircular sections of the shells A and B, is arranged to form a rest or support for a turntable 53 which is rabbeted as seen at 54 to fit into the circular flange 52 formed by the base of the sections A and B. This turntable is composed of two sections H and I, arranged to be joined together, and when so joined form a complete disk. The bolts 55 are provided to fasten the sections rigidly together.

56 designates a series of antifrictional means fixed on arbors 57 and provided in the turntable 53 for the purpose of increasing its sensitiveness. Side rollers 58 are provided to keep the turntable normally central. They are fixed on arbors 59 which are secured on lugs 60 cast on the table itself. By this construction the carriages are arranged to turn relatively to the turntables which remain stationary while the carriages take the curves of the track.

61 designates arms whose ends are curved and screw-threaded and arranged to extend through a hole provided in the turntable 53, and 62 designates nuts engaging the screw-threaded portion of the arms 61 on the under side of the turntable.

63 indicates washers interposed between the nuts 62 and the bottom surface of the turntable 53.

64 designates grooves provided in the surface of the turntable 53 to form seats for the arms 61 and to prevent the arms from swinging and turning.

65 designates knuckles fitted over the ends of the arms 61. The ends of the arms 61 are screw-threaded to receive nuts 66 which form locks for the knuckles 65, and 67 indicates washers interposed between the nuts 66 and the knuckles 65.

68 designates roller-bearings interposed between the knuckles 65 and the arms 61, the said roller-bearings being mounted in suitable recesses 69 provided on the interior of the knuckles. The arms 61 are turned off, as shown in dotted lines at 70, to form a shoulder against which rest the knuckles 65. The knuckles 65 operating on steel roller-bearing 68, allow a fore-and-aft swing to the car. The knuckles 65 are provided with hanger-arms 71 preferably made integral therewith, and as seen in Fig. 22, carrying a pin 72. This pin revolves upon rollers 76 set into a steel bushing 77 pressed into the clevis 78. The head 73 of the pin 72 and the nut 74 form caps on each side of the bushing 77 to keep roller 76 in place. The loops 79 of the clevises or stirrups 78 are designed to form a seat for the car-body supporting-rods 80.

81 designates annular roller-bearing-containing-knuckles mounted on the car-body supporting-rods 80, and provided with shanks 82 which terminate in heads or plungers 83 which are screwed or otherwise fastened at the extremity of shank 82. The shank 82, as well as the head 83, is housed in a casing 84 which is provided with a removable cap 85 secured to the body of the casing by cap-screws 86. The cap itself is provided with a central opening 87 through which the shank 82 extends. Coiled about the shank 82 is a helical spring 88, the final coil of which is seated on a boss 89 provided on the under side of the cap 85. The tension of this spring acts directly in a vertical line on head 83.

90 designates a furcation cast integral with casing 84 and bored to receive pin 91 which will carry the eyes of car-straps 92. These straps or bands 92 partially encircle the body 93 of the car proper which will be the subject of more detailed description hereinafter.

The means previously described for hanging the car body from the car-supporting-rods are such that the body itself is constantly maintained in a condition of sensitive elasticity, making it readily responsive to the slightest vibratory motion. The shifting of pressures or weights of the car is all taken up by the spring arrangement within the casing 84 previously described, the plunger of which serves not only as a means for compressing the springs against the weight of the car body, but may likewise serve as a cushion for a body of fluid matter, such as air, to replace the action of, or coöperate with the tension spring.

$c$ designates washers interposed between the cap 85 and the casing 84 to form a seal for confining a fluid such as air, etc., in the casing, thereby to cause the plunger-head 83 to act in response to strains and sudden forces arising from any unequal distribution of weights against an air cushion. The cap 85 is provided with an air-duct $d$ through which the air enters into and discharges from the chamber in the casing during the descent and ascent of the plunger. The casing 85 is likewise provided with an air-duct $e$ to prevent the creation of a vacuum in the chamber when the plunger rises, which would forestall and destroy the cushioning effect of the plunger in the casing. Thus, as a downward pull of the car is exerted on one side of the car body, the spring will be compressed by the cap and the plunger-head while at the same time the air-cushion will be brought into play. On the other side the spring will be expanded and the same effect attained.

94 designates another carriage composed of two sections F and G which are spaced to leave a slot $y$ at the top and provided with annular semicircular platforms 95 and 96 at the bottom. These semicircular platforms 95 and 96 abut against each other under the I-beams or track 7, and the flanges 97 and 98 of the platforms are arranged to accommodate a rabbeted sectional turntable 99, the sections 100 and 101 of which are secured together after placing the same over the flanges 97 and 98 of the platforms. The turntable is likewise provided with roller-bearings 102 to reduce the friction and increase its sensitiveness.

On the turntable 99 of the carriage 94 are several arms 103 on which the hangers for suspending the car body are fixed. The arrangement on the rear carriage is a duplicate of the arrangement and mechanism shown and described in connection with Fig. 22, and the repetition of the description is deemed unnecessary.

In the sections F and G of the carriage 94 are provided roller-bearing traction wheels 104 and 105 which are arranged to ride upon the top flanges of the I-beams and to carry the load of the car body 93. Additional end rollers 106 are provided to form a rest for the sections F and G when the carriages make a gap. 107 and 108 designate additional roller-bearing-rollers which are provided in the sections and which take up the width of the I-beams and the space of the hangers; these rollers being provided to prevent the lateral tilting of the carriage which is liable to occur when curves or unequal rail-surfaces are encountered or when the high speed of the car causes the car-body to swerve.

The turntables 53 and 99 are interconnected by a pair of reaches 109 and 110, these reaches being bolted to the outside corners of said turntables, as is seen at 111. These reaches prevent the movement of the turntables 53 and 39 and rigidly unite the forward with the rear turntable, thereby permanently uniting the forward and rear carriages. On the said reaches is a hound 112 which spans the distance between the reaches 109, 110, the curvature of which is equal to the arc described by the travel of the carriage 12 about a central point. Said hound 112 comprises a stepped member, a cross-section of which represents substantially a Z, as seen in the sectional illustration of the same in Fig. 9. On this hound the horizontal roller-bearing-roller 113 and the vertical roller-bearing-roller 114 are arranged to travel when the carriage turns. These rollers are journaled in the rearward portion of the member 115 which is bolted onto the rear end of the carriage-shell A. The carriage-sections are held together by tie-rods S.

Bolted onto the carriage-shell B is a similar member 116 whose rear end is provided with a horizontal roller-bearing-roller 117 and a vertical roller-bearing-roller 118 which are arranged to travel on the hound 112. The members 115 and 116 are connected by the flooring 119 and also by the brake-rod 120. On the brake-rod 120 are fixedly mounted braking-cams 121 and 122 which are located beneath and in line with the I-beams 7. These braking-cams 121 and 122 are connected by a rod 123 to which is pivotally secured a link 124. Connected with the end of the link is a bell-crank-lever 125 which is fulcrumed on a shaft 126 which connects the two bosses 127 of the tenders 115 and 116. On the other end of the bell-crank-lever 125 is an operating lever 128 which extends in the conning-tower 129 provided on the top, and forward of the car body 93 directly under the front carriage. The operation of the link 124 which is connected with the cams 121 and 122 produces a movement of the cams upwardly and against the under surface of the I-beams, the frictional contact of said braking-cams tending by reason of their eccentricity to frictionally and tightly engage the rails, thus breaking the impact of the car and bringing it to a halt. In this arrangement of brakes it is apparent that the greater the speed of the car the greater will be the braking action of the cams frictionally against the under side of the I-beams.

The propelling mechanism is mounted in the tenders of the forward carriage, and the operating levers for controlling the different mechanisms all terminate in the conning tower 129, as will appear more fully hereinafter.

The driven shaft 26, which receives motion from the prime mover through the intermediate gearing incased in the housing 27, is provided with clutches 130 through the medium of which the sprockets 25 are connected and disconnected from the power-transmitting shaft 26, in this manner leaving the traction wheels free without interrupting the motion of the engine shaft. This provision is made to permit the driven shaft to drive a dynamo while the car is at a standstill, for the purpose of furnishing currents for various mechanisms connected with train-operating systems. These clutches are operated at one and the same time by the duplex lever 131 onto which is pivotally secured an operating or controlling rod 132 which extends in the conning-tower within reach of the operator.

133 designates a sprocket loosely mounted on the driven shaft 26 and connected by chain 134 with a sprocket 135 mounted on armature-shaft 136 of a dynamo 137.

138 is a clutch for causing the sprocket 133 to rotate with the operating-shaft, thereby to transmit power to the dynamo for generating a current for lighting or other purposes. The clutch is operated by a bell-crank-lever 139 to which is connected an operating-rod 140 which also extends into the conning-tower.

141 designates a sprocket loosely mounted on the driven shaft and connected by chain 142 with the sprocket 143 mounted on shaft 144 which is journaled in the tender 116 and the bracket 145 which is bolted to the flooring 119. On the end of the shaft 144 is a bevel gear 146 which meshes with the bevel-gear 147 mounted on the underside of the flooring 119, and which is always in mesh with the gear 146.

148 is a spindle which is provided with a feather-way 149 in which a feather 150 provided on the gear 147 operates. This provision is made to enable the spindle 148 to be slid vertically within the gear 147 which is revolubly hung from the flooring 119, and the boss 151, provided on the upper surface of the flooring, by the operation of the lever 152. This lever is forked, as seen at 153.

Swiveled in the forks of the lever 152 is a split collar or ring 154 which is made to fit in the groove 155 of the ring or collar 156 which is rigid with the spindle 148; in this manner permitting the spindle 148 to be raised and held in such position by this means without interfering with the rotation of the same. The spindle is provided with a squared portion 159 which is adapted to engage the open-ended cuff or boxing 160 which is mounted on the end of a stem 161 extending through a bracket 162 secured to and between the I-beams 7. On the end of the stem 161 is a pinion 163 arranged to mesh with the turntables 164, to be hereinafter more fully described.

166 is an operating-rod for controlling the transmission in casing 27. 167 is an operating-rod for governing the clutch 168 which couples the sprocket 141 with the power shaft 26. 169 is also an operating-rod for governing the movement of the spindle 148 through the orifice in the pinion 147. All of these operating rods 128, 132, 140, 166, 167, and 169, terminate in the conning-tower 129. Each of the rods is connected to a controlling lever 170 which is hung from a collar 171 loosely fitting over a boss 172 which is bolted to the underside of the plate 173 provided in the upper portion of the conning-tower 129. Between the collar 171 and the boss 172 may be interposed steel ball-bearings. 174 is an inverted quadrant fixed to the collar 171, and 175 is a pin which extends through an opening provided in the quadrant 174 and boss 172 and the plate 173; the end of said pin being screw-threaded to receive a nut 176. Interposed between the nut and the end of the pin is a cup 177 in which are housed steel ball-bearings 178. These operating-rods pass through a slot 181 provided in the conning-tower over the head of the operator or engineer. The plate 173 provided in the upper part of the conning-tower is circular to conform to the shape of the upper portion of the tower, and is provided at two opposite points with sockets 182 for the accommodation of pins or bolts 183 which extend through screw-threaded openings provided in bosses o provided on the tower, as seen in Fig. 32. In this manner the whole ceiling of the conning-tower, together with the mechanism attached thereto, remains horizontal while the car swings. This manner of arranging the levers for controlling the operating-rods for the various mechanical devices connected with the present invention, causes the levers to move with the movement of the carriages on curves while they retain their perpendicularity when the car is caused to swerve or swing.

185 designates a bellows provided on the end of each car.

186 is a coupling-plate for a bumper which is fixed to the car and which extends within the space 187 provided in the operating car for its reception. The coupling-plates are pivoted to the operating car by means of the pin 188 and rocks in the space 187. In so doing it compresses the bellows, thereby preventing any ingress of dust and making a very simplified coupling. The coupling-plates are upright to the top and bottom of the operating cars, and the liability of the rear car or trailer to force itself against the rear of the front car is prevented by this coupling which takes up the rocking side motion of the car.

189 and 191 designate towers, there being four, of which one is omitted from the drawing. These towers are provided with four gallows, two of which,—viz., 192 and 193,—are shown in Fig. 30. The gallows 192 and 193 are interconnected at one end by the truss 194, the construction being duplicated at the other side of the tower.

The I-beams or tracks 7, which up to a crossing are continuous, are cut off and separated, as seen at 195, at a point slightly beyond the drop-arms or hangers 196 from which the I-beams are suspended. The tracks or I-beams 7 are cut on a radius measured by the distance from the center of the turntable to the point of cut-off of the track, to allow free play of the turntable 164 in its action.

Riveted to the under section of the truss 194 is a circular table or plate 197 provided with a suitable external gear 198. This circular table 197 is provided with a projecting circular runway 199 which is reinforced by the ribs 200. Attached to the said table 197 are hangers 165, shown in Fig. 6, and 201 in Fig. 28, to which the I-beams 203 are fastened and suspended. The illustration of the track system in Fig. 28 shows a gap 205 which will allow the passage of carriages.

The turntable 164 is provided with conical rollers 206 which are distributed around the surface of the turntable and are fastened in the yokes 207 riveted to the upper surface of the turntable. These rollers 206 travel on the runway 199 of the circular table which is riveted to the truss 194.

The operation of turning the cars and carriages with the separated portion of the tracks, is accomplished substantially in the following manner:—The front carriage or drive carriage, after having traveled upon the separated tracks and crossed the gap 205, is brought to a standstill directly underneath the boxing or cuff 160. This boxing is then engaged by the head 159 provided on a spindle 148 to which motion is imparted by means of suitable gears, all previously described. The spindle being then set in motion by suitable beveled gearing which is connected and disconnected from the prime-mover on one of the carriages by suitable clutches, transmits power to the boxing and the stems 161 on the end of which are mounted the pinions 163 which are always in mesh with the main gear on the turntable. The operation of said pinions engaging said external gear, causes the turntable, which is mounted on the runways of the circular disk, to revolve, carrying with it the separated tracks and their hangers, and the carriages and car bodies carried by the I-beams or track. In this manner the carriages can be transferred from one track to another, crossing each other at right angles. After the operation of turning the turntable and tracks, the spindle and squared portion thereof are withdrawn from the boxing and the car may then proceed on its changed course. The motion described by the travel of the car body is illustrated in Fig. 30. For operating the turning or switching mechanism for larger or standard cars, the arrangement or system shown in Fig. 31 is employed. In this system, instead of using four separate turntables, as in the system just described, but one is used, the same being suspended from the truss 208.

209 designates a platform provided with a runway 210 on which several conical rollers 211 journaled in the turntable proper, 212, are adapted to ordinary travel.

213 designates braces or connections for securing the ring 214 with the inner circle 212 of the turntable.

215 designates pinions which are journaled in brackets 216 rigidly fixed to the circle 214 of the turntable.

217 is an outside ring provided with an internal gear 202 cast in sections and rigidly secured to the truss 208. In this instance a single turntable is used for the four intersecting tracks or rails, thus permitting the carriages and cars to be transferred from one track to another, and in this manner also always keeping the gear wheels or pinions ready for action. The four tracks are hung from a single turntable, and the revolution of this turntable carries with it the tracks as well as the carriages of the cars preparatory to transferring them to another track.

The car-body 93 is a tubular body terminating at its front end in a cone-shaped nose 218, and composed of a plurality of sections riveted together at suitable intervals to form a perfectly rigid and stable body. The sections may be of any desirable material most suited for the construction of this character of cars, such for instance as steel or wood, or of any material that will add lightness to the body and facilitate the propulsion of the car.

In the periphery of the tubular body or shell is provided a series of windows which is mounted directly in the frame-work 219 of the car. The windows are rigidly fitted in the frame-work. The rear end of the car body is rounded, as seen at 220, and provided with a vestibule 221 which is provided with the coupling arrangement illustrated in Fig. 7, thus forming a passage-way from one car to another, and at the same time allowing one car to travel out of alinement with the other without interfering with the passage-way.

222 designates a sliding door mounted in the steel framework 223 which is riveted onto the car body, and the shape of which is in conformity with the shape of the body itself. The door itself is of the sliding type of any suitable construction.

224 designates an opening in the rear part of the car which forms the entrance to the vestibule thereof, and 225 is a sliding guard or door mounted in the frame-work 226 riveted to the car body. The conning tower 129 is mounted on the upper portion of the car body and forward of the same, and is riveted to the structural framework of the same.

What I claim is:—

1. The combination with an elevated, suspended, spaced track, of a sectional carriage encircling said track and provided with a slot, wheels journaled in said carriage, a car body, means for suspending said car body from said carriage, and means for propelling said carriage.

2. The combination with an elevated, suspended, spaced track, and a rack interposed in the space between the rails of said track, of means for suspending said track, slotted wheeled carriages adapted to travel on said track, said suspension means being adapted to pass through the slot of said carriages, a car body, means for suspending said car body from said carriage, means carried by said carriage for imparting motion to the wheels thereof, and means connected with said first-named means to engage said rack and assist the propulsion of the carriage.

3. The combination with an elevated, suspended track, of a plurality of two-part wheeled carriages encircling said track and adapted to travel thereon, said carriages being provided with flanges, a car body loosely suspended from the flanges of said carriages, and means for propelling one of said carriages.

4. The combination with an elevated, suspended track, of a plurality of sectional wheeled carriages adapted to travel thereon, the sections of said carriages being adapted to envelop said track, a car-body loosely suspended from said carriages, means for imparting motion to the wheels of one of said carriages, and means for controlling said means.

5. The combination with an elevated, suspended, spaced track, of sectional wheeled carriages encircling and adapted to travel on the top of said track, said wheels being spaced, a car body loosely suspended from said carriages, said carriages having movement relative to said car body, means for steadying said carriages, and means for propelling one of said carriages.

6. The combination with an elevated, suspended track, of a pair of wheeled carriages adapted to travel on said track, a car body suspended from said carriages, rollers extending the width of and engaging said track for steadying said carriages, elastic means for compensating for uneven motions of the car body, and means for propelling one of said carriages.

7. The combination with an elevated, suspended track, of a pair of two-part carriages adapted to encircle and travel on said track, a plurality of turntables loose on said carriages, antifriction means interposed between said turntables and carriages, a car-body suspended from said turntables, means for rigidly connecting said turntables, and means for propelling one of said carriages.

8. The combination with an elevated, suspended, spaced track, of a plurality of sectional hollow carriages encircling said track and provided with a slot, traction means in said carriages, said carriages being provided with flanges below said track, turntables loosely mounted on said flanges, a car body loosely suspended from said turntables, propelling mechanism carried by one of said carriages, and reaches for rigidly interconnecting said turntables.

9. A tubular car body and suspension means for said car body comprising a shell composed of separate sections joined together at one point only, and each section being provided with a semi-circular flange, wheels journaled in each section of said shell, a turntable loosely carried by the flanges of said sections, and means for holding said shell against lateral movement, in combination with a track and suspension means for said track.

10. The combination with an elevated, suspended track and suspension means therefor, of carriages provided with wheels adapted to travel on said track, said carriages being composed of sections which encircle said track, turntables loosely carried by said carriages, means for loosely mounting said turntables on said carriages, a car body, means for suspending said car body from said turntables, and a prime mover for propelling one of said carriages.

11. The combination with an elevated, suspended track and hangers therefor, of slotted carriages adapted to travel on said track, the slots in said carriages being arranged to permit said hangers to pass therethrough, one of said carriages being provided with members rearwardly thereof, rollers in said members, a plurality of turntables carried by said carriages and loosely mounted thereon, reaches connecting said turntables, a hound carried by said reaches forming a support for the members of said first-named carriage, said rollers on said members being arranged to travel on said hound, a car body suspended from said turntables, and a motor carried by one of said members for propelling one of said carriages.

12. The combination with an elevated, suspended track and a support therefor, of a plurality of wheeled carriages adapted to travel on said track, turntables loosely carried by said carriages, said carriages having movement relative to said turntables, means for interconnecting said turntables, a car body, means for suspending said car body from said turntables, means for controlling the motions of said car body, and means for propelling one of said carriages.

13. The combination with an elevated, suspended track and a support therefor, of carriages adapted to travel on said track, one of said carriages having members, a plurality of turntables carried by said carriages and loosely mounted thereon, reaches for connecting said turntables, a hound carried by said reaches forming a support for the members of said first-named carriage, a car body, means for suspending said car body from said turntables, and means for propelling one of said carriages.

14. The combination with an elevated, suspended track, and a support therefor, of carriages adapted to travel on said track, one of said carriages having members, a plurality of turntables carried by said carriages and loosely mounted thereon, reaches for connecting said turntables, a hound carried by said reaches forming a support for the members of said first-named carriage, a car body suspended from said turntables, and means carried by said members for propelling one of said carriages, and means for controlling said means.

15. The combination with an elevated, suspended track and a support therefor, of carriages adapted to travel on said track, one of said carriages having members, a plurality of turntables carried by said carriages and loosely mounted thereon, reaches for connecting said turntables, a hound carried by said reaches forming a support for the members of said first-named carriage, a car body suspended from said turntables, and means for propelling one of said carriages.

16. The combination with an elevated track and hangers therefor, of a plurality of wheeled carriages adapted to travel on said track, said carriages comprising a shell consisting of two sections joined together below said track and slotted above said track to permit of the passage of said hangers, said carriages being provided with annular rabbets, turntables loosely mounted on said rabbets, means carried by said carriages for imparting motion to the wheels of one of said carriages, means for interconnecting said turntables, a car body loosely suspended from said turntables, and means for suspending said car body to respond to variable motions.

17. The combination with an elevated main track and hangers for said track, sections of disjoined track arranged to form a continuous track with said main track, said sections being provided with gaps, means for suspending said disjoined sections, in combination with a car body, means for suspending said car body from said track, means carried by said means for propelling said car body, and means controllable by said propelling means for actuating said disjoined sections of track to transfer said car body from said main line of track to another main line at substantially right angles thereto.

18. The combination with an elevated track, suspension means for said track, of a car body, means for suspending said car body from said track comprising a slotted hollow shell adapted to encircle the bottom and sides of said track, and said slot being provided to permit of the free passage of said suspension means, a turntable carried by said carriage, wheels journaled in said carriages, and a motor carried by said carriages for imparting motion to said wheels.

19. The combination with an elevated track, suspension means for said track, of a car body and means for suspending said car body from said track comprising a slotted shell consisting of two sections united at a point below said track, said slot being provided to permit of the free passage of said suspension means for the track, said carriage being provided with an annular rabbet, a turntable carried by said rabbet, antifriction rollers carried by said turntable, hangers carried by said turntable, straps encircling said car body, and interposed means for flexibly connecting said hangers and straps.

20. The combination with an elevated track and hangers for suspending said track, of two-part slotted wheeled carriages enveloping said track, said slot being arranged to accommodate said hangers, and said carriages being provided with an annular rabbet, a car body, turntables revoluble relatively to said carriages for supporting said car body, means carried by said carriages for propelling said car body, and means for rigidly interconnecting said turntables.

21. The combination with an elevated track and means for suspending said track, of a plurality of sectional wheeled carriages arranged to travel on said track, a prime mover carried by one of said carriages, means for transmitting motion from the prime mover to the wheels of one of said carriages, antifriction rollers carried by said carriages for preventing the swaying or rocking thereof, a car body, and means for suspending said car body from said carriages.

22. The combination with an elevated track, and means for suspending said track, of a plurality of two-part wheeled carriages arranged to travel on said track, a prime mover carried by one of said carriages, geared means for transmitting motion from the prime mover to the wheels of one of said carriages, means carried by said carriages for preventing the swaying or rocking thereof, said means being adapted to bear against the lower flange of the track, a car body, and turntables for suspending said car body from said carriages.

23. The combination with an elevated spaced track, and means for suspending said track, of a plurality of sectional wheeled carriages arranged to travel on said track, said sectional carriages being joined at a point below the track and provided with flanges, a prime mover carried by one of said carriages, means for transmitting motion from the prime mover to the wheels of the sections of said carriages, roller bearing rollers carried by said carriages for preventing the swaying or rocking thereof, said rollers being adapted to bear against the lower flange of the track, a car body, and turntables loose on the flanges of said carriage sections for suspending said car body.

24. The combination with an elevated track, means for suspending said track, means for spacing said track, and a support for said suspension means, of a pair of sectional wheeled carriages adapted to travel on said track, said sectional carriages being joined together at a point below the track, propelling means carried by one of said carriages, means carried by said carriages and in constant contact with the bottom flanges of said tracks for maintaining said carriages steady, a car body, and means for suspending said car body from said carriages to permit of the movement of said carriages relative to said car body.

25. The combination with an elevated track, suspension means for said track, means for spacing said track, and a support for said suspension means, of a pair of two-part wheeled carriages adapted to travel on said track, propelling mechanism carried by one of said carriages, rollers engaging the bottom flange of the track for preventing the swaying of the carriages, means carried by said carriages for preventing the lateral shifting of the carriages, turntables loosely carried by said carriages, a car body, means for suspending said car body from said turntables, and means carried by said carriages for maintaining steady the position of the car body.

26. The combination with an elevated track, suspension means for said track, and means for spacing said track, of a pair of wheeled carriages adapted to travel on said track, propelling means for one of said carriages, a cog-wheel carried by one of said carriages and disposed centrally thereof and below said track, means for transmitting motion thereto from the traction wheels of one of said carriages, a car body, and means for loosely suspending said car body from said carriages.

27. The combination with an elevated track, suspension means for said track, and means for spacing said track, of a pair of wheeled carriages adapted to travel on said track, propelling means for one of said carriages, a cog-wheel carried by one of said carriages, said cog-wheel being disposed centrally of and below said track and adapted to extend into the space therebetween, means for transmitting motion thereto from the traction wheels of one of said carriages, a car body, and means for loosely suspending said car body from said carriages.

28. The combination with an elevated track, means for suspending said track, means for spacing said track, a rack interposed in the space between said track at predetermined points, and means for supporting said suspension means, of a plurality of wheeled carriages adapted to travel on said track, propelling means carried by one of said carriages, a cog-wheel disposed centrally of and below said track and adapted to engage said rack, means for operatively connecting said cog with the driven wheel of one of said carriages to rotate constantly therewith, a car body, and means for suspending said car body from one of said carriages.

29. The combination with an elevated suspended track, of a rack disposed at intervals below said track, a sectional wheeled carriage arranged to travel on said track, a car body loosely suspended from said carriage, means for propelling said carriage, a cog-wheel below said track and in line with said rack, means for connecting said cog-wheel with said means for propelling said carriage, and a resilient support for said car body.

30. The combination with an elevated track, means for suspending said track, means for spacing said track, a rack below said track and disposed at determined intervals, of wheeled carriages arranged to travel on said track, means for imparting motion to the wheels of one of said carriages, a cog-wheel below said track and in line with said rack, means for operatively connecting said cog with the driven wheels of one of said carriages, a car body, turntables loosely and revolubly mounted on said carriages, and resilient means for suspending said car body from one of said carriages.

31. The combination with an elevated track, suspension means for said track, and means for spacing said track, of a plurality of sectional carriages inclosing said track, traction wheels provided in said carriages and adapted to travel on said track, a rabbeted platform on said carriages and below said track, a car body, means for suspending said car body from said platform, and a prime mover carried by one of said carriages.

32. The combination with an elevated track, suspension means for said track, and means for spacing said track, of a plurality of sectional carriages inclosing said track, internal traction wheels journaled in said carriages and adapted to travel on said track, means for securing the sections of the carriages together, said carriages being provided with a platform below the surface of the track, a car body, means for suspending said car body from said platform, and a prime mover mounted in one of said carriages.

33. The combination with an elevated track, a plurality of hangers for suspending said track, and means for spacing said track, of a plurality of sectional carriages, sections of said carriages being spaced to form a slot for the passage of the hangers, and provided with rabbeted platforms, means carried by said carriages for mounting the same on said track, a turntable engaing the rabbets of said platforms, antifriction means for mounting said turntables on said rabbets, a car body, means for suspending said car body from said turntables, and a prime mover carried by one of said carriages.

34. The combination with an elevated track, hangers for said track, and means for spacing said track, of a pair of carriages composed of separate sections fitting on opposite sides of said track, traction wheels journaled in said sections and adapted to travel on said track, said wheels being spaced, and said carriages also being spaced to form a slot for the passsage of the hangers therethrough, platforms on said sections provided below the plane of the track, said platforms being rabbeted, turntables engaging the rabbets of said carriages, a car body, means for suspending the car from said turntables, and means for propelling one of said carriages.

35. The combination with a suspended track, and means for supporting said suspended track, of a plurality of sectional carriages provided with semicircular platforms and adapted to fit on opposite sides of the track, said sections being slotted to permit the passage of the hangers for the track, means for securing the sectional parts of the carriages together, a plurality of shafts journaled in one of said carriages, a plurality of traction wheels keyed to the shafts and adapted to travel on said track, sprockets mounted on said shafts, means carried by one of said carriages for transmitting power to the shafts of said traction wheels, sectional turntables mounted on said platforms, a car body, and means for suspending said car body from said sectional turntables.

36. The combination with an elevated track, suspension means for said track, and means for spacing said track, of a plurality of wheeled carriages adapted to travel on said track, turntables carried by said carriages, means interposed between said carriages and platforms for offsetting the direct and lateral strains, a car body, and means carried by said turntables for suspending said car body.

37. The combination with an elevated track, suspension means for said track, and means for spacing said track, of a plurality of wheeled carriages adapted to travel on said track, turntables carried by said carriages, horizontal antifriction rollers interposed between said carriages and turntables, vertical antifriction rollers interposed between the outside of said carriages and the inside of said turntables, a car body, and means carried by said turntables for suspending said car body.

38. The combination with an elevated track, suspension means for said track, and means for spacing said track, of a plurality of wheeled carriages arranged to travel on said track, said carriages being provided with circular platforms, sectional turntables fitting over said platforms, a plurality of arms fixed to said turntables, a plurality of yokes carried by said arms, a supporting rod carried by said yokes, a car body, a plurality of straps surrounding said car body, spring means for securing the ends of said straps, and means for securing said means to the car-body supporting-rod.

39. The combination with an elevated track, suspension means for said track, and means for spacing said track, of a plurality of wheeled carriages adapted to travel on said track, a car body, a plurality of turntables carried by said carriages, means for suspending said car body from said turntables, comprising an arm, a hanger on said arm, roller bearings interposed between said hanger and arm, a pin extending through said hanger, roller-bearings about said pin, a jacket about said roller-bearings, a clevis carried by said jacket, a car body supporting-rod extending through said clevis, a plurality of straps surrounding said car-body, and means for securing said straps to said car-body supporting-rod.

40. The combination with an elevated track, suspension means for said track, and means for spacing said track, of a plurality of wheeled carriages adapted to travel on said track, a car body, a plurality of turntables carried by said carriages, means for suspending said car body from said turntables comprising arms, hangers on said arms, clevises carried by said hangers, car-body supporting-rods extending through and carried by said clevises, hangers on said rods, housings for said hangers, car-body supporting-straps connected to said housings, and means carried by said housings for resiliently hanging said car body.

41. The combination with an elevated track, suspension means for said track, and means for spacing said track, of a plurality of wheeled carriages adapted to travel on said track, a car body, a plurality of turntables carried by said carriages, means for suspending said car body from said turntables comprising arms, hangers on said arms, clevises carried by said hangers, car-body supporting-rods extending through and carried by said clevises, hangers mounted on said car-body supporting-rods provided with heads, housings inclosing said hangers, springs coiled about the shanks of said hangers, and car-body carrying-straps pivoted to said housings.

42. The combination with an elevated track, suspension means for said track, and means for spacing said track, of a plurality of wheeled carriages adapted to travel on said track, a car body, a plurality of turntables carried by said carriages, means for suspending said car body from said turntables comprising arms, hangers on said arms, clevises carried by said hangers, car-body supporting-rods extending through and carried by said clevises, hangers mounted on said car body supporting-rods provided with heads and forming plungers, air ducts in said housings to form an air cushion for the plunger-heads, clevises made integral with said housings, car body supporting-straps terminating in loops, and pins extending through said clevises and the loops of said supporting straps.

43. The combination with an elevated track, suspension means therefor, and means for spacing said track, of a two-part wheeled carriage adapted to travel on said track, said carriage parts being provided with semicircular flanges below said track, a turntable engaging said flanges and arranged to hold said parts together, a car body, and means for suspending said car body from said turntable.

44. The combination with an elevated track, suspension means therefor, and means for spacing said track, of sectional carriages adapted to travel on said track, each of said car sections being provided with semicircular flanges below said track, means for securing said sections together, turntables engaging said flanges and arranged to hold said sections together, an elongated tubular car body, and means for suspending said car body from said turntables.

45. The combination with an elevated track, suspension means therefor, and means for spacing said track, of two-part wheeled carriages adapted to travel on said track, each of said parts being provided with semicircular flanges below the surface of the track, one of said carriages being provided with tenders, a prime-mover in said tender, turntables mounted on the flanges of the parts of said carriages and adapted to hold said parts together, a tubular car body, a conning tower on said car-body, a plurality of levers in said conning-tower for controlling said prime mover, and means for suspending said car body from said turntables.

46. An elongated tubular car body, a conning tower on said car body, a plurality of sectional carriages for supporting said tubular body, said carriages being provided with traction wheels, and one of said carriages being provided with a prime mover, levers for controlling said prime mover from said conning tower, and means for mounting said levers in said conning tower to remain steadily horizontal, in combination with a track on which said carriages are adapted to travel, and suspension means for said track.

47. The combination with an elevated track, suspension means therefor, and means for spacing said track, of a plurality of sectional wheeled carriages adapted to travel on said track, a car body, means for suspending said car body from said carriages, one of said carriages being provided with a prime mover and a driven shaft, gears loose on said driven shaft, chains connecting said gears with the wheels of one of said carriages, clutches on said driven shaft for locking said gears on said shaft, and means for controlling said means from said conning-tower.

48. A plurality of carriages, traction wheels therein, a car body suspended from said carriages, a prime mover in one of said carriages, a shaft driven by said prime mover, means for transmitting power from said shaft to the wheels of one of said carriages, means for uncoupling said means from said shaft, a dynamo, means for operating said dynamo, said means being connected with said driven shaft, clutch mechanism for locking or unlocking said power-transmitting mechanism on said driven shaft, and means for controlling all said means from said conning tower.

49. A plurality of carriages, traction wheels therein, a car body suspended from said carriages, a prime mover in one of said carriages, a shaft driven by said prime mover, means for transmitting power from said shaft to the wheels of one of said carriages, means for uncoupling said means from said shaft, a dynamo, means for operating said dynamo from said driven shaft, said means being connected with said driven shaft, clutch mechanism for locking or unlocking said power-transmitting mechanism on said driven shaft, levers for controlling said mechanism, and means for hanging said levers in said conning tower so that their position is steadily horizontal.

50. The combination with an elevated track, means for suspending said track, of a plurality of wheeled carriages composed of two hollow sections adapted to envelop the track and arranged to travel on said track, a prime mover carried by one of said carriages, means for transmitting power from said prime mover to the wheels of one of said carriages, a tubular car body, and means for suspending said car body from said carriages.

51. A tubular car body and a suspension means for said car body comprising a shell composed of two hollow sections each provided with semicircular flanges, traction wheels journaled in each section of said shell, and means for securing the sections together.

52. A tubular car body and a suspension means for said car body comprising a shell composed of two hollow sections spaced to form a slot, and each section being provided with semicircular flanges, traction wheels journaled in each section of said shell, tenders on said sections, a prime mover carried by said tenders, means for transmitting power from said prime mover to the wheels of said sections, and means for securing the sections together.

53. A tubular car body and suspension means for said car body comprising a shell composed of separate sections joined together at one point only, and each section being provided with semicircular flanges, traction wheels journaled in each section of said shell, and a turntable loosely hung from the flanges of said sections, in combination with a track and suspension means for said track.

54. In combination with an elevated, suspended track, a carriage composed of two separate hollow sections fitting over said track and being joined at a point below said track, traction wheels within said sections arranged to travel on said track, an anti-friction roller journaled in said sections and bearing against the under-side of the track for maintaining steady the position of the carriage, means for imparting motion to the traction wheels, a car body, and means for suspending said car body from said sections.

55. In combination with an elevated track and suspension means therefor, a carriage composed of two hollow separate sections journaled together below and fitting on opposite sides of said track and being spaced above said track to allow free passage of said suspension means, wheels journaled in said sections and arranged to ride on said track, said sections being provided with semicircular flanges, a turntable on said flanges, means for imparting motion to the traction wheels of said sections, a car body, and means for suspending said car body from said turntable.

56. Two main lines of track at substantially right angles, whose continuity is interrupted at the point of intersection of the two lines, sections of disjoined track arranged to form a continuous track with the main lines, said sections being provided with gaps, and means for revolubly suspending said sections of track, in combination with a car body, a wheeled carriage adapted to travel on said track for suspending said car body, means for propelling said carriage, and means carried by said carriage and operable by said means for propelling said carriage to revolve said sections of track when said carriage and car body have traveled thereon to transfer the same to another track.

57. Two main lines of track at substantially right angles whose continuity is interrupted at the point of intersection of the two lines, sections of disjoined track arranged to form a continuous track with the main lines, said sections being provided with gaps, and a turntable for suspending said sections of track, in combination with a car body, a wheeled carriage adapted to travel on said track for suspending said car body, means for propelling said carriage, and means carried by said carriage and operable by said means for propelling said carriage to revolve said turntable when said carriage and car body have traveled thereon to transfer the same to another track.

58. Two main lines of track at substantially right angles, whose continuity is interrupted at the point of intersection of the two lines, sections of disjoined track arranged to form a continuous track with the main lines, said sections being provided with gaps, a turntable for suspending said sections of track, geared means for operating said turntable, in combination with a car body, a wheeled carriage adapted to travel on said track for suspending said car body, means for propelling said carriage, and means carried by said carriage and operable by said propelling means for operating said geared means to revolve said turntable when said carriage and car body have traveled thereon to transfer the same to another track.

59. Two main lines of track disjoined, and disjoined sections of track at right angles to each other arranged to be thrown in parallel alinement with said main lines of track, a fixed gear forming suspension means for the tracks, suspension means for said gear, a turntable mounted to revolve relatively to said gear, a pinion carried by said turntable and in mesh with said gear, and a spindle connected with said pinion, in combination with a car body, a carriage therefor, means for propelling said carriage, and means operable by said means and attachable to said spindle for revolving said pinion and turntable.

60. Two elevated lines of track at substantially right angles, whose continuity is interrupted at the point of intersection of the two lines, sections of disjoined track arranged to form a continuous track with the main lines, said sections being provided with gaps, and means for suspending said sections of track comprising an externally-geared disk having a flange, a turntable revolubly mounted on said flange, pinions, spindles connected to said pinions, in combination with a wheeled carriage adapted to travel on said track, a car body suspended from said carriage, means for propelling said carriage, and means carried by said carriage and operable by said propelling means for imparting motion to said pinions to revolve said turntable, and means for detachably securing said spindles to said propelling means.

61. The combination with an elevated spaced track and means for suspending said track, of slotted wheeled carriages adapted to travel on said track, said means for suspending said track being arranged to pass through the slot of said carriage, a car body suspended from said carriage, and means for propelling said carriage.

62. The combination with an elevated track and hangers for said track, of wheeled carriages provided with slots, adapted to travel on said track, said slots being arranged to permit of the free passage of said hangers, a car body suspended from said carriage, means carried by said carriage for imparting motion to the wheels of said carriage, and means for transferring said carriage and car body from one main line to another main line at substantially right angles thereto.

63. The combination with an elevated track and hangers for said track, of wheeled carriages provided with slots, adapted to travel on said track, said slots being arranged to permit of the free passage of said hangers, a car body suspended from said carriage, means carried by said carriage for imparting motion to the wheels of said carriage, and a turntable for transferring said carriage and car body from one main line to another main line at substantially right angles thereto.

64. The combination with an elevated track and hangers for said track, of wheeled carriages provided with slots, adapted to travel on said track, said slots being arranged to permit of the free passage of said hangers, a car body suspended from said carriage, means carried by said carriage for imparting motion to the wheels of said carriage, a turntable for transferring said carriage and car body from one main line to another main line at substantially right angles thereto, and means operatively connected with said propelling means for the carriages for operating said turntable to transfer the carriages.

65. Two elevated lines of track at substantially right angles, whose continuity is interrupted at the point of intersection of the two lines, sections of disjoined track arranged to form a continuous track with the main lines, and means for suspending said sections of disjoined track, in combination with a two-part carriage arranged to encircle said track, a car body, and means for suspending said car body from said carriage.

66. Two elevated intersecting lines of track and suspension means therefor, said track at the point of such intersection being disjoined, a revoluble support for the disjoined sections, in combination with a carriage adapted to travel on said track, a car body, and a turntable carried by said carriage for suspending said car body.

67. Two elevated intersecting spaced lines of track and suspension means therefor, the track at the point of intersection being disjoined, a rack below and interposed between the rails of said track at determined points along the same, a revoluble support for said disjoined sections, in combination with a carriage adapted to travel on said track, a car body, a turntable carried by said carriage for suspending said car body, means for propelling said car body, and means operable by said propelling means for engaging said rack below said track to assist in the propulsion of the carriage up grades.

68. Two elevated lines of track at substantially right angles whose continuity is interrupted at the point of intersection of the two lines, sections of disjoined track arranged to form a continuous track with said lines, said sections being provided with gaps, revoluble means for suspending said sections of disjoined track, in combination with a car body, means for supporting said car body from said track, a carriage adapted to travel on said track, and means carried by said carriage for operating said revoluble means when said carriage and car body have traveled on said disjoined sections to transfer the same to another line of track at substantially right angles thereto.

69. The combination with an elevated track and hangers for said track, of slotted wheeled carriages adapted to travel on said track, said slots being arranged to permit of the free passage of said hangers, a car body suspended from said carriage, a motor carried by said carriage for imparting motion to the wheels thereof, and means for transferring said carriage and car body from one main line to another main line at substantially right angles thereto.

70. The combination with an elevated suspended track, of a plurality of sectional wheeled carriages adapted to travel on said track, the sections of said carriages being adapted to envelop said track on the bottom and sides thereof and being spaced apart at the top to permit of the free passage of the suspension means for the track, a car body loosely suspended from said carriages, a motor for imparting motion to the wheels of one of said carriages, and means for controlling said motor.

In testimony whereof, I have hereunto set my hand at Los Angeles California this 12th day of August 1907.

FLETCHER E. FELTS.

In presence of—
 JAMES R. TOWNSEND,
 ANTON GLOETZNER.